UNITED STATES PATENT OFFICE.

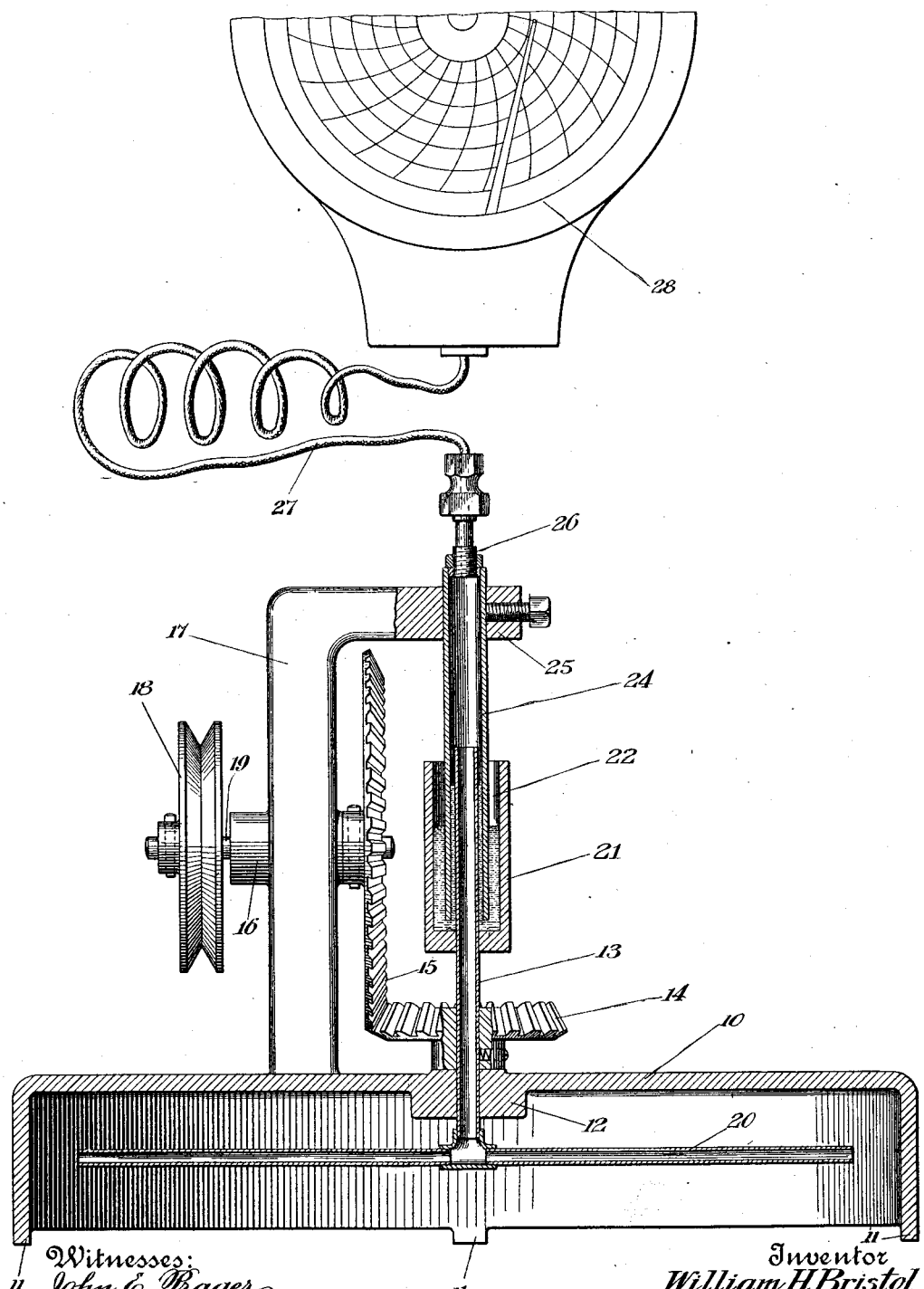

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

TACHOMETER.

1,034,190.  Specification of Letters Patent.  Patented July 30, 1912.

Application filed May 20, 1912.  Serial No. 698,367.

*To all whom it may concern:*

Be it known that I, WILLIAM H. BRISTOL, citizen of the United States, and a resident of Waterbury, in the county of New Haven and State of Connecticut, have invented certain new and useful Improvements in Tachometers, of which the following is a specification.

The invention relates to tachometers or devices for indicating and recording the speed of rotating mechanisms; and more particularly to tachometers of the pneumatic type.

It has for its object to indicate or record in a simple and effective manner, and at a distance from a rotating mechanism, the speed and variations of speed at which such mechanism rotates; and more particularly to provide a substantially frictionless and absolutely perfect seal for the connection between the rotating member of the apparatus and the pressure indicating or recording device, thereby maintaining the accuracy of the indication.

The nature of the invention will best be understood when described in connection with the accompanying drawing which shows in elevation the improved apparatus, partly in section, and a portion of the indicating and recording device connected therewith.

In the drawing, 10 designates a hollow, circular protecting base whose lower edge is slightly raised by suitable feet 11 or the like to permit of free circulation of the air, and at its upper surface is provided a bearing 12 for a hollow shaft 13. This shaft is arranged to be rotated from any desired mechanism (not shown) through a set of bevel gear wheels 14 and 15, the former being fixedly secured to the shaft 13 and the latter mounted to turn in a bearing 16 of an upright or standard 17 extending upwardly from the base 10. A pulley 18 is secured to the shaft 19 of the bevel gear wheel 15, whereby the said shaft may be suitably driven.

The lower end of hollow shaft 13 terminates in a horizontal tube 20 adapted to rotate therewith and open at its extremities. Although I have illustrated but one tube connected to the shaft 13, it is evident that a plurality of such tubes may be employed or, as a limiting case, simply two parallel disks.

The upper end of the hollow shaft is surrounded by a casing 21, secured thereto and rotating therewith. This casing provides a sealing chamber 22 within which is contained a suitable sealing liquid such as oil or mercury. In the sealing chamber 22, and about the upper and free end of hollow shaft 13, is placed a tube 24 extending close to the bottom of said chamber, and at its other end this tube is held in an arm 25 of the upright or standard 17. A suitable connection 26 is secured to the outer end, and to this is attached a flexible capillary tube 27 leading to the vacuum recording gage 28.

As the shaft 13 rotates, and with it the tube 20, the mass of air contained in said tube is rotated and, due to the action of centrifugal force thereon, will cause a reduction of the pressure in the said hollow tube, the shaft 13, the tube 24, the capillary tube 27 and the vacuum gage 28. The degree of reduction of pressure is a function of the velocity of rotation of the said mass of air and of the radius of its center gravity. This radius being fixed, the reduction of pressure will be a function of the velocity of rotation and will serve as a measure of said velocity, which can thus be indicated and recorded by the vacuum gage 28. As the pressure is thus reduced, during the rotation of casing 21 relatively to tube 24, the column of liquid in chamber 22 is depressed and rises in the portion between the shaft 13 and the tube 24 (as shown). The seal, however, is maintained perfectly within the limits of the apparatus, for the degree of vacuum produced never exceeds the possible head of liquid therein.

The arrangement hereinbefore set forth provides a very simple and inexpensive apparatus, which, due to the substantially frictionless seal, is extremely sensitive to speed variations and the accuracy of the indications of which is maintained because of the impossibility of leakage, or loss of vacuum, at a given velocity. The rotating member is suitably protected by being incased in the casing 10 and which at the same time provides a suitable base for the entire apparatus. The apparatus, furthermore, is operated in vertical position and may be conveniently connected with any rotatable mechanism whose speed it is desired to indicate or record.

I claim:—

1. A pneumatic tachometer, comprising: a rotatable hollow shaft, one end of which is open, and means to rotate the said shaft; means at the other end of the shaft adapted to reduce the pressure therein upon the rotation of said shaft; a tube surrounding the open end of said hollow shaft, the connection between said tube and open end of the hollow shaft being sealed by a suitable liquid; a vacuum indicating or recording device; and means connecting said tube with said indicating or recording device to afford communication between the same.

2. A pneumatic tachometer, comprising: a rotatable hollow shaft, one end of which is open, and means to rotate the said shaft; means at the other end of the shaft adapted to reduce the pressure therein upon the rotation of said shaft; a casing secured to and surrounding said shaft at the open end thereof; a tube extending therein and about the open end of said shaft, said casing being adapted to contain a suitable liquid to seal the connection between said tube and hollow shaft; a vacuum indicating or recording device; and means connecting said tube with said indicating or recording device to afford communication between the same.

3. A pneumatic tachometer, comprising: a hollow base; a vertical hollow shaft, one end of which is open, and the other end of which passes into said base; a tube open at both ends and secured to the end of said hollow shaft within said base; means to rotate said shaft; a casing secured to and surrounding said shaft at the open end thereof; a tube extending therein and about the open end of said shaft, said casing being adapted to contain a suitable liquid to seal the connection between said tube and hollow shaft; a vacuum indicating or recording device; and means connecting said tube with said indicating or recording device to afford communication between the same.

Signed at New York, in the county of New York, and State of New York, this 17 day of May A. D. 1912.

WILLIAM H. BRISTOL.

Witnesses:
LAURA E. SMITH,
FREDK. F. SCHUETZ.

Copies of this patent may be obtained for five cents each, by addressing the "Commissioner of Patents, Washington, D. C."